(12) United States Patent
Ernst et al.

(10) Patent No.: US 6,937,262 B2
(45) Date of Patent: Aug. 30, 2005

(54) IMAGING DEVICE FOR PRINTING FORM

(75) Inventors: Uwe Ernst, Mannheim (DE); Bernd Vosseler, Heidelberg (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 10/463,943

(22) Filed: Jun. 18, 2003

(65) Prior Publication Data

US 2004/0020986 A1 Feb. 5, 2004

(30) Foreign Application Priority Data

Jun. 24, 2002 (DE) .......................................... 102 28 106

(51) Int. Cl.$^7$ .............................................. B41J 27/00
(52) U.S. Cl. ....................................... 347/244; 347/258
(58) Field of Search ................................ 347/137, 241, 347/244, 256–258, 224, 234, 238, 248, 21; 359/19–20, 619, 625

(56) References Cited

U.S. PATENT DOCUMENTS

| | | | |
|---|---|---|---|
| 4,428,647 A | 1/1984 | Sprague et al. ............... 359/20 |
| 5,168,401 A | * 12/1992 | Endriz ........................ 359/625 |
| 5,619,245 A | * 4/1997 | Kessler et al. ............... 347/241 |
| 5,923,475 A | * 7/1999 | Kurtz et al. ................. 359/619 |
| 6,181,362 B1 | 1/2001 | Laberge ....................... 347/233 |
| 6,252,622 B1 | 6/2001 | Laberge ....................... 347/238 |
| 2002/0005890 A1 | 1/2002 | Beier et al. ................. 347/238 |
| 2002/0129723 A1 | 9/2002 | Beier et al. ............... 101/463.1 |
| 2003/0169328 A1 | 9/2003 | Ernst et al. ................. 347/234 |

FOREIGN PATENT DOCUMENTS

| | | |
|---|---|---|
| DE | 10031915 | 1/2002 |
| DE | 10111871 | 9/2002 |
| EP | 0601485 | 12/1993 |
| JP | 03234077 | 10/1991 |

* cited by examiner

*Primary Examiner*—Hai Pham
(74) *Attorney, Agent, or Firm*—Davidson, Davidson & Kappel, LLC

(57) ABSTRACT

A device for recording images on a printing form (46), having at least one laser diode bar (10), which includes a number of laser diodes (12) whose image spots (56) lie disjunctly in an image field (36), and having an array (16) of microlenses (20) positioned in the emission region (14) of the light radiated by the laser diode bar, one microlens (20) being assigned to each optical path (18) of a laser diode (12). The device is distinguished in that at least one first laser diode (22) and one second laser diode (24) are densely positioned on the laser diode bar (10) in such a way that the first optical path (26) of the first laser diode (22) and the second optical path (28) of the second laser diode (24) run through a first microlens (30) of the array. The device can be used, in particular, in a print unit or a printing press and, at a given width of the laser diode bar, makes it possible to provide a greatest possible number of imaging channels (40).

12 Claims, 3 Drawing Sheets

IMAGING DEVICE FOR PRINTING FORM

Priority to German Patent Application No. 102 28 106.8, filed Jun. 24, 2002 and hereby incorporated by reference herein, is claimed.

BACKGROUND INFORMATION

The present invention is directed to a device for imaging a printing form, having at least one laser diode bar, which includes a number of laser diodes whose image spots lie disjunctly in an image field, and having an array of microlenses positioned in the emission region of the light radiated by the laser diode bar, one microlens being assigned to each optical path of a laser diode. The present invention is also directed to a method for imaging a printing form, using at least one laser diode bar, which includes a number of independently addressable laser diodes whose image spots lie disjunctly in an image field and in whose emission region of the radiated light, an array of microlenses is positioned, one microlens being assigned to each optical path of a laser diode.

In printing-form imaging units or print units of printing presses, so-called direct-imaging print units, devices for imaging a printing form which have a plurality of imaging channels, in particular, those provided with solid-state lasers, semiconductor lasers or laser diodes, are often used simultaneously in order to efficiently reduce the time required to optically record an image on the two-dimensional surface of the printing form. If a redundancy-free imaging method is used, i.e., if the imaging channels are moved over the two-dimensional surface of the printing form in such a way that the point where each printing dot is to be set is passed exactly once by an imaging channel, then, given the use of an imaging device having n imaging channels, the imaging time needed for the entire surface to be recorded on is reduced to the (1/n)-times of the time. A further reduction can be attained just as efficiently when b imaging devices are used concurrently, which, in a redundancy-free manner, analogously to the procedure described above, expose sections of the printing form at a time. The imaging time for the entire surface to be recorded on is then reduced to the (1/b)-times of the time, to be precise, using b imaging devices having n imaging channels, to the (1/(bn))-times of the time.

The substantial reduction in the imaging time achieved by a redundancy-free parallelization is thus largely dependent on the number of imaging channels used or available (capable of being activated). The imaging speed scales linearly with the number of simultaneously used imaging channels. When a laser diode bar is used, in particular one constituted of an array of independently addressable laser diodes, as a light source in a device for imaging a printing form, in the context of a given, maximally attainable width that is conditional upon the technical production process, the number of imaging channels can only be increased by reducing the pitch between two adjacent laser diodes.

For the purpose of beam formation in devices for imaging printing forms which use laser diodes, in particular independently addressable laser diode bars (IAB), as a light source, microoptical components are generally provided in an optical system placed within the emission region of the laser diode bar, in order to collimate the radiated light in the direction of the slow axis of the diode lasers. In particular, microlens arrays, so-called SALA (slow-axis lens arrays) can be used individually or monolithically. Given the minimally attainable distance of the microlenses or of the SALA to the output facets of the laser diodes, the maximally permissible illumination of each individual microlens, as well as the particular divergence of the emergent laser radiation, the microlenses must have a minimum diameter and, consequently, a certain minimum distance from one another. This minimum distance represents a lower limit for the distance, i.e. the pitch, among the diode lasers and also for the number of diode lasers on the laser diode bar of a given width, when exactly one microlens is assigned to one laser diode under known methods heretofore. A device of the species for imaging a printing form using a semiconductor laser array, in whose emission region an array of microlenses is positioned, is discussed, for example, in U.S. Pat. No. 4,428,647.

With regard to the minimum distance among adjacent laser diodes, the following is thus to be noted. When beams diverging in the emission region of the laser diodes overlap already before or upstream from the microlenses or before the SALA, or when the divergent beams are wider than the microlenses (for example, greater in width than the output face) already at the microlenses or at the SALA, then the optical quality of the image spot produced by the optical system is seriously degraded. A significant portion of the radiation is sliced off. Often, an optical system for collimating or for reducing the divergence of the fast axis is positioned before the microlenses, so that the distances between the microlenses and the laser diodes cannot be reduced. Generally, it is not possible to reduce the angle of divergence of the beams emitted by the laser diode bar. Therefore, it is only possible to prevent the beams from being sliced off when a minimum distance is observed among adjacent microlenses.

In order for a number of imaging channels (regardless of whether they are arranged on one or a plurality of imaging devices) to pass the points on a two-dimensional printing-forme surface on which printing dots are to be set by image spots, in a redundancy-free manner, certain advance-feed rules must be observed for passing points imaged in a preceding step, to arrive at points imaged in a later step. These advance-feed rules must be strictly adhered to, particularly when, in an imaging step, n printing dots are to be placed by n imaging channels at points which do not lie densely on the printing form, i.e., whose spacing does not correspond to the minimal printing dot pitch p (typically 10 micrometers). To achieve a dense imaging, printing dots are placed between already recorded printing dots in a subsequent imaging step. This procedure is also known as interleaving. German Patent Application No. DE 100 31 915 A1, for example, characterizes an interleaving method for optically recording images on a printing form: At a given minimal printing dot pitch p, for a number of n imaging channels on a generated setting line, which are uniformly spaced apart and whose adjacent image spots on the printing form have a spacing a, which is a multiple of the minimal printing dot pitch p, a redundancy-free advance feed by the line motion (np) is ensured in the direction of the generated setting line, when the natural numbers n and (a/p) are prime.

It should be noted in this connection that the two-dimensional surface of the printing form to be recorded on is typically covered by the imaging channels quickly in a first direction and slowly in a second direction, which is linearly independent of and preferably normal to the first direction. In this context, the generated setting line generally does not lie in parallel to the fast first direction, but can be slanted at an angle, other than zero, from the slow second direction. This slant makes it possible to attain a printing dot pitch that is smaller by the factor of the cosine of the angle (projection). The generated setting line is preferably normal to the fast first direction. The image spots of the imaging channels can also be placed on the generated setting line by activation times which are delayed relatively to one another and between which the relative motion between the imaging device and the printing form is continued. Delayed activation times are useful, for example, for correcting geometric errors in the imaging device design and/or for precisely positioning the image spots (negligibly small displacement caused by delayed activation in comparison to the substantial relative motion).

From these explanations, it becomes immediately clear to one skilled in the art that a certain symmetry or a certain uniformity is necessary with respect to the pitch of adjacent laser diodes in the array of laser diodes on the laser diode bar, to make possible an interleave imaging method based on simple displacements (translational motions). For that reason, under the state of the art, laser diode bars for imaging devices feature a uniform distance among adjacent laser diodes.

The implementation of a redundancy-free interleave method in accordance with the German Patent Application No. 100 31 915 A1 is critically dependent on n imaging channels being available, thus capable of being activated, at a uniform pitch on a generated setting line. As a strategy to follow in the event an imaging channel fails or does not operate properly, it proposes using the largest, still cohesive section of the imaging channels at a uniform distance in order to avoid streaks on the printing form where the surface is not recorded on, and to ensure an invariably good imaging quality. It is clear that to implement a redundancy-free interleaving method in accordance with this document, one must select a number of imaging channels of the still cohesive section that is prime to the multiple of the pitch (a/p). Following this strategy, any further imaging channels experiencing failure or improper operation result in only very short sections of the original n parallel imaging channels remaining. Consequently, the imaging time increases considerably with the decrease in any still remaining parallelization. For example, in the least favorable instance, in every imaging channel that fails in the middle of the largest cohesive section on the generated straight line, the imaging time increases to twice the parallelized imaging time, thus for a plurality of failures, to a multiplicity thereof. This is completely unacceptable in practical applications.

Especially critical when laser diode bars are used in imaging devices is generally the failure or improper operation of a laser diode when exactly one laser diode is assigned to each imaging channel. This is because restoring the original reliable operation requires replacing the entire laser diode bar. This is not practical for economic reasons alone, because the other laser diodes on the bar are generally still in proper service condition, so that the laser diode bar has not completely lost its ability to function.

U.S. Pat. No. 6,181,362 B1 proposes assigning two laser diodes on one laser diode bar to each imaging channel. To record on a printing form, one laser diode is used for each imaging channel. In the event that the first laser diode in one imaging channel fails, the second laser diode is used in its place. Alternatively, U.S. Pat. No. 6,252,622 B1 proposes assigning each imaging channel a primary laser diode on a first laser diode bar and a secondary laser diode on a second laser diode bar. To record on a printing form, one laser diode of one of the two laser diode bars is used per imaging channel. In the event the primary laser diode on the first laser diode bar in one imaging channel fails, the secondary laser diode on the second laser diode bar is used in its place. One drawback of these proposed approaches is, inter alia, that, when working with a defined emission characteristic of the laser diodes on one laser diode bar that determines the minimal spacing between adjacent laser diodes, the width of the laser diode bar must be increased, or a second laser diode bar must be positioned more precisely in relation to a first laser diode bar. The result is that the overall height of the device for imaging a printing form is increased.

SUMMARY OF THE INVENTION

An object of the present invention is to devise a device for imaging a printing form, having a laser diode bar, on which, given a defined width of the laser diode bar, the greatest possible number of imaging channels is available.

The present invention provides a device for imaging a printing form, having at least one laser diode bar, which has a number of laser diodes whose image spots, generated, in particular, by a downstream imaging optics of the device, lie disjunctly in an image field, and having an array of microlenses positioned in the emission region of the light radiated by the laser diode bar, one microlens being assigned to each optical path of a laser diode. The device is distinguished in that at least one first laser diode and one second laser diode are densely positioned on the laser diode bar in such a way that the first optical path of the first laser diode and the second optical path of the second laser diode run through a first microlens of the array. Thus, the radiation of the first laser diode and the radiation of the second laser diode transit a first microlens, in particular without the light from the laser diodes being focused through the microlens and, if indicated, further optical elements, such as a macrooptics, at one image spot. The image spots, which are generated in one image field, do not coincide, in other words, do not overlap or do lie apart from one another. This means that the laser diodes define imaging channels which are separate from one another. In particular, the laser diode bar may be an IAB; the laser diodes may be independently addressable.

In one specific embodiment, the array of microlenses may be a SALA. More than two laser diodes may be assigned to one specific microlens. Two or more laser diodes may be assigned to each microlens of the array of microlenses. The laser diodes may be positioned symmetrically or uniformly about the optical axis of the associated microlens. In the laser diode bar, a number of laser diodes may be disposed in a one-dimensional or a two-dimensional array. The laser diodes of one row or one column may all be arranged in one plane across the laser diode bar. In particular, a two-dimensional array may be Cartesian or right-angled.

The concept underlying the present invention is, inter alia, to devise a laser diode bar and to provide it in an imaging device, and for the adjacent laser diodes on the laser diode bar to be inter-spaced at different distances, i.e. to have a different pitch. The laser diode bar may be designed, in particular, in such a way that a number of laser diodes is evenly spaced in sub-arrays/micro-arrays, the sub-arrays/microarrays, in turn, for example, the points of concentration of the sub-arrays/microarrays, being evenly spaced in a super-array. This means that a laser diode bar according to the present invention having a number of independently addressable laser diodes is distinguished by at least one laser diode on the laser diode bar being spaced at a first distance from a first, adjacent laser diode, and by the first distance being different from a second distance of the laser diode from a second adjacent laser diode.

In a device for imaging a printing form, an optical system, typically an imaging optical system, including intermediate images, is configured downstream from the laser diode bar. The optical system may have refractive and/or reflective optical elements. An imaging optics having micro-optical and macro-optical components (aggregates or optical elements) is especially beneficial when its purpose is to project the light from the laser diodes into one image plane. In this context, a macro-optical component may be designed to facilitate a variable focal length of the optical system of the device for imaging a printing form. In one advantageous specific embodiment of the device according to the present invention for imaging a printing form, after passing through the array of microlenses, the optical paths of the laser diodes run through a macro-optical system to be focused at an image field. In particular, at least one section of the surface of a printing form may be positioned in the image field, or the surface of the printing form is moved in relation to the image field in such a way that sections of the surface come to rest in succession in the image field.

In addition to at least one optical element that influences the slow axis of the emitted light, the optical system of the device according to the present invention for imaging a printing form may also have at least one optical element for influencing the fast axis of the emitted light. In one advantageous specific embodiment of the device for imaging a printing form, before passing through the array of microlenses, the optical paths of the laser diodes run through an optical system for reducing the divergence of the light emerging from the laser diode bar, in at least one spatial direction, substantially normally to the propagation direction of the light. The spatial direction is preferably the fast axis. The optical system for reducing the divergence of the light may generate a virtual image.

In one preferred specific embodiment of the device according to the present invention for imaging a printing form, the printing form to be recorded on may be accommodated on a rotatable cylinder. Alternatively, the surface of a rotatable cylinder may itself constitute a printing form. In other words, the printing form may be plate-shaped (having one rim) or sleeve-shaped (having two rims).

It may be a simply recordable (conventional), re-coatable or re-recordable printing form. In the context of this representation of the device according to the present invention, a printing form is also understood to be a so-called digital printing form. A digital printing form is a surface which is used as an intermediate ink carrier for printing ink, before it is transferred to a printing substrate. In this context, the surface may be structurized per se into ink-trapping and ink-repelling regions or only be provided with printing ink in a structurized fashion as a result of the imaging process. The digital printing form may be structurized by the reciprocal action with laser radiation in regions which either dispense or do not dispense printing ink to a printing substrate or an intermediate carrier. The process of structurizing the digital printing form may take place before or after ink is applied to the printing form. The printing form may also be essentially made up of printing ink, for example, for use in a thermo-transfer process.

While a relative movement in one direction spanning the surface of the printing form is rendered possible by a rotation of the cylinder about its axis, a movement having at least one component that is essentially normal to the spanning direction is able to be achieved by a translational motion of the imaging device at least in one direction that is essentially parallel to the axis of rotation of the cylinder. Thus, the imaging device may be designed to be movable.

Many types of solid-state lasers, semiconductor lasers, or laser diodes are suited for use in the imaging device according to the present invention. These include, in particular, single-mode laser diodes. The laser diodes may be single-strip laser diodes. In one advantageous embodiment of a specific embodiment of the imaging device according to the present invention, so-called surface-emitting laser diodes (vertical cavity surface emitting laser, VCSEL) are used because of their advantageous radiation pattern, in particular because of the minimal divergence of the emerging light.

In connection with the imaging device, the present invention also relates to a method for imaging a printing form, using at least one laser diode bar, which includes a number of independently addressable laser diodes whose image spots, which are generated, in particular, by a downstream imaging optics, lie disjunctly in an image field and in whose emission region of the radiated light, an array of microlenses is positioned, one microlens being assigned to each optical path of a laser diode. The method according to the present invention is distinguished by the use of a laser diode bar having at least one first laser diode and one second laser diode, which are disposed densely on the laser diode bar in such a way that the first optical path of the first laser diode and the second optical path of the second laser diode run through a first microlens of the array. In particular, the image spots of the imaging channels may substantially lie on a generated straight line on the printing form.

One specific embodiment of the method according to the present invention for imaging a printing form provides for a strategy whereby, in the event of failure, either the first laser diode or the second laser diode, whose optical paths run through the first microlens of the array, is operated. In other words, the imaging channel of one laser diode may be used as a replacement imaging channel in the event the other laser diode fails. An alternative strategy for failure situations provides for replacing a failed laser diode of a first microarray with a second laser diode of a second microarray. In this case, both laser diodes of the second microarray are operated. In other words, a first laser diode and a second laser diode, whose optical paths run through a first microlens of the array, are operated when another laser diode, whose optical path runs through another microlens of the array, has failed. A general procedure to follow as a strategy for dealing with the failure of laser diodes on a laser diode bar of an imaging device is described in prior German Patent Application No. 102 10 308.9. An analysis of the failure pattern, i.e., of the still usable imaging channels, is made, and a reduced, but still maximally possible feed rate is determined in connection with the number of imaging channels still usable for the imaging process. It is the design of the optical system and the number of imaging channels used, i.e., which correlates to the feed rate, that determines the microarray, and the substitute laser diode for another failed laser diode in the device according to the present invention for imaging a printing form.

In principle, the image spots of the first laser diode and of the second laser diode will not coincide in the image plane. However, the design of the optical system may be such that the image spots do coincide in the image plane. However, since a printing form positioned in the image plane is moved relatively to the imaging device, a printing dot may then be advantageously set by a time-delayed driving of the substitute imaging channel of the one laser diode when the image spot of the substitute imaging channel comes to rest precisely at the position of the printing form where it would be set by the imaging channel of the other laser diode.

The imaging method according to the present invention may include, in particular, exposing the printing form in relative movements (advance-feed movements), thereby implementing an interleave method, between the imaging channels and the printing form. The redundancy-free advance-feed rules of German Patent Application No. 100 31 915 A1, as already described in the introductory part of the Specification, are preferred for an interleave method of this kind. In addition, the line generated by the imaging channels may be inclined at an angle other than zero toward the slow feed direction.

The imaging device according to the present invention may be used quite advantageously in a printing-form exposure unit (having a flat bed or drum) or in a print unit of a printing press. A print unit may include one or more imaging devices. A plurality of imaging devices may be configured in such a way that they are able to simultaneously optically record images on sections of a printing form. A printing press according to the present invention, which has one or more print units according to the present invention, may be a web-processing or sheet-processing press. Typically a sheet-processing press may include a feeder, a delivery unit, and one or more print-finishing stations, such as a varnishing unit or a dryer. A folding apparatus may be situated downstream from a web-processing printing press. The printing method underlying the print unit or the printing press of the present invention may be a direct or indirect flat-bed method, a flexographic printing method, an offset printing method, a digital printing method or the like.

BRIEF DESCRIPTION OF THE DRAWINGS

Further advantages and advantageous specific and further embodiments of the present invention are presented on the basis of the following figures and their descriptions, in which.

DETAILED DESCRIPTION

Figure 1:
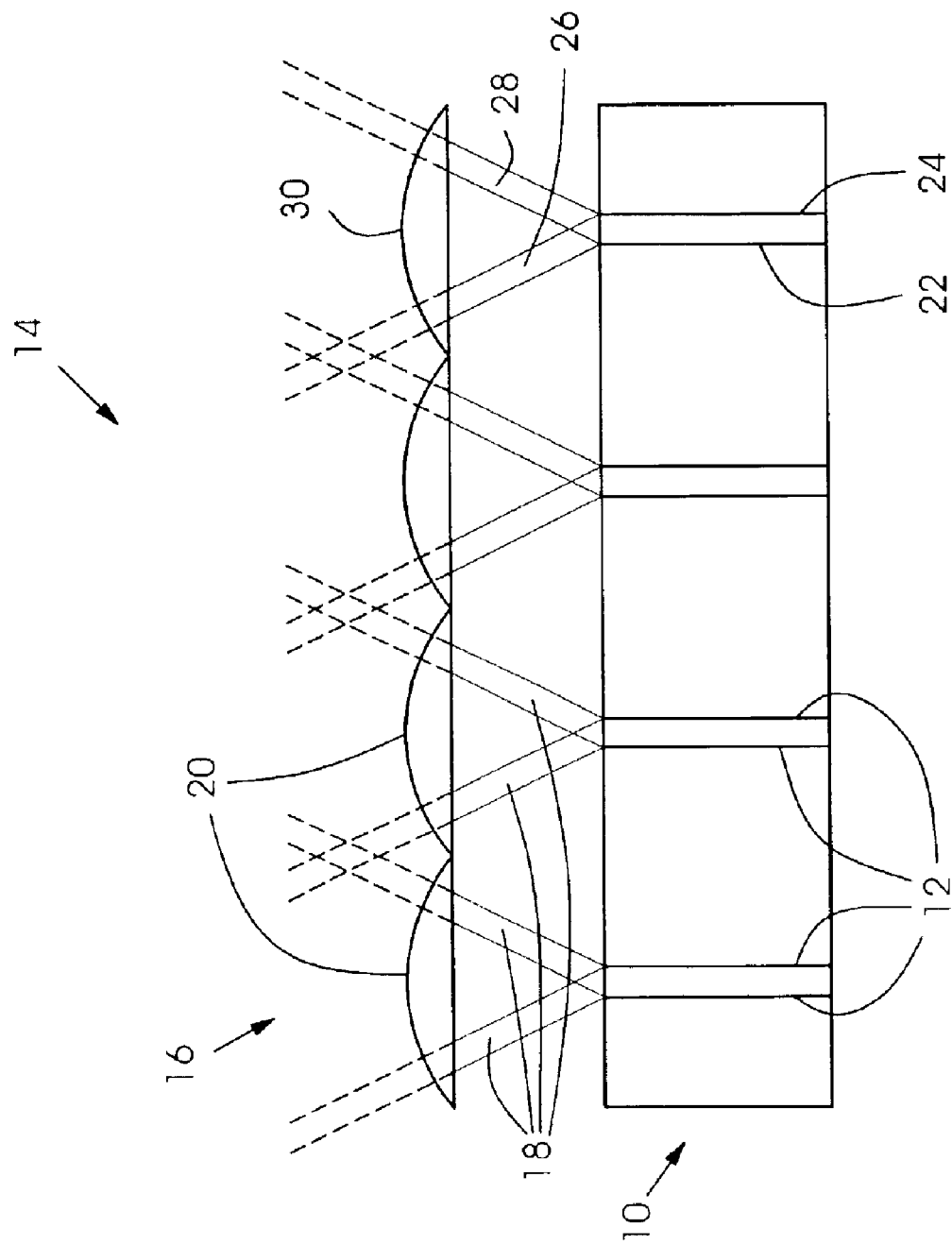
FIG. 1 shows a schematic representation of a laser diode bar according to the present invention having an array of microlenses arranged in the emission region, in one specific embodiment of an imaging device according to the present invention.

FIG. 1 schematically depicts a laser diode bar according to the present invention having an array of microlenses arranged in the emission region, in one specific embodiment of an imaging device according to the present invention. By way of example, a laser diode bar 10 has eight laser diodes 12 (indicated schematically by a line), which are arranged in four groups of two laser diodes 12 each. The spacing among laser diodes 12 within one group is smaller than the spacing between two groups (for example, the spacing between adjacent laser diodes, the one being situated in a first and the other in a second group). An array 16 of microlenses 20 is positioned in emission region 14 of laser diodes 12. In this specific embodiment, array 16 is a monolithic SALA having four microlenses. Optical paths 18 of laser diodes 12 run through microlenses 20. The light emitted by laser diodes 12 combined into one group, runs through the same microlens 20. A first laser diode 22 and a second laser diode 24 form one group. First optical path 26 of first laser diode 22 and second optical path 28 of second laser diode 24 run through a first microlens 30. The optical paths are not cropped by a first microlens 30. The overlapping of the two paths is not critical, since adjacent laser diodes 22, 24 are imaged onto separate image spots in one image field. The adjacent laser diodes are, at most, partially temporally coherent to one another. Spatial coherence is not significant in the context of the present invention.

The laser diode bars may preferably have a number of laser diodes from the interval of natural numbers from 8 to 600. To implement an interleave method, it is advantageous when the pitch of the image spots set by the imaging channels on the printing form, measured in minimal spacings between printing dots, is prime to the number of imaging channels.

Figure 2:
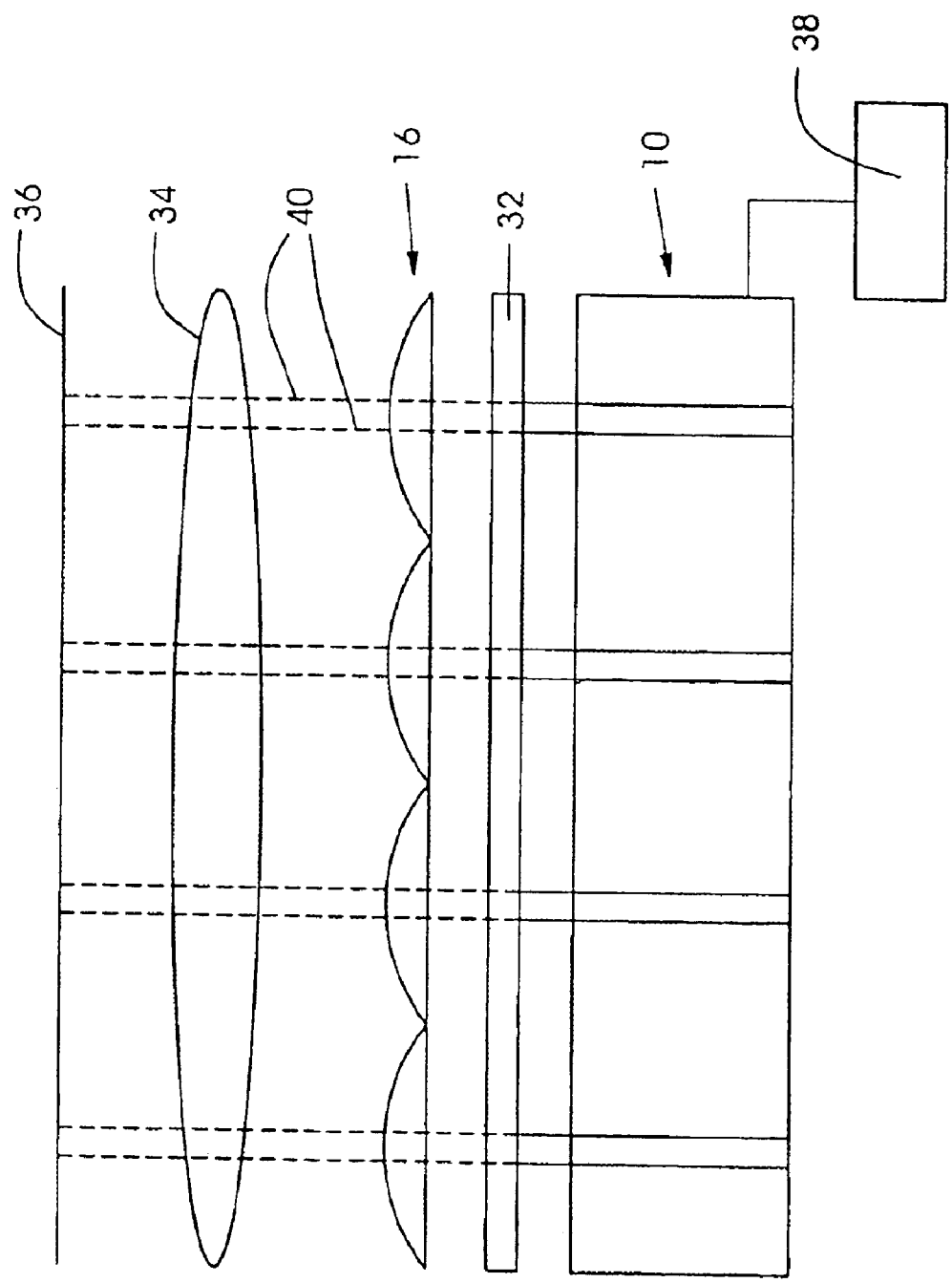
FIG. 2 shows the topology of an advantageous specific embodiment of an imaging optics in an imaging device according to the present invention, having a laser diode bar according to the present invention.

FIG. 2 illustrates the topology of one advantageous specific embodiment of an imaging optics in an imaging device according to the present invention having a laser diode bar according to the present invention. It shows a laser diode bar 10 according to the present invention, exemplarily having eight laser diodes combined into four groups of two laser diodes each. Imaging channels 40 of the eight laser diodes are indicated by dashed lines, without further details being given with regard to the imaging properties of the optics of the imaging device. The light emerging from laser diode bar 10 propagates through a collimating optics 32, before impinging on an array 16 of microlenses. Positioned downstream from array 16 of microlenses is a macrooptics 34, which provides for an imaging of the laser diodes in an image field 36. A control unit 38 is provided for laser diode bar 10, so that the laser diodes on laser diode bar 10 are independently addressable. The intensity of the emerging light radiation is variable. A time-delayed driving or actuation of the laser diodes is also possible.

In an image field 36 (specifically, on a printing form), microoptics 16 having a first magnification factor and downstream macrooptics 34 having a second magnification factor preferably produce image spots that essentially lie in one line or one generated setting line. A delayed actuation, accompanied by a simultaneous relative motion between the imaging device and the printing form, may also result in printing dots in one line. Microoptics 16 may be designed to produce image spots of adjacent laser diodes that are spaced apart at uniform distances. Alternatively, the laser diodes may also be imaged into image field 36 in such a way that the image spots are able to be combined into groups, adjacent groups having specific distances g from one another, for example, measured from one point of concentration (middle position in the group) to another, and adjacent diode lasers in one group having a specific distance a from one another. When working with predefined magnification factors of microoptics 16 and of macrooptics 34, proper distances among the laser diodes on laser diode bar 10 must be chosen.

For certain interleave methods, it is necessary that group interpacings g and laser diode distances a in one group be integral multiples of the printing-dot pitch to be described (screen resolution). Depending on the position of the laser diodes on laser diode bar 10 and the amplification factors, configurations are also possible where the sequence of image spots in the image field does not correspond to the sequence on laser diode bar 10. However, this is unimportant, since there is a fixed allocation between laser diodes and image spots, so that it is merely necessary to resort the image data for the imaging operation.

Figure 3:
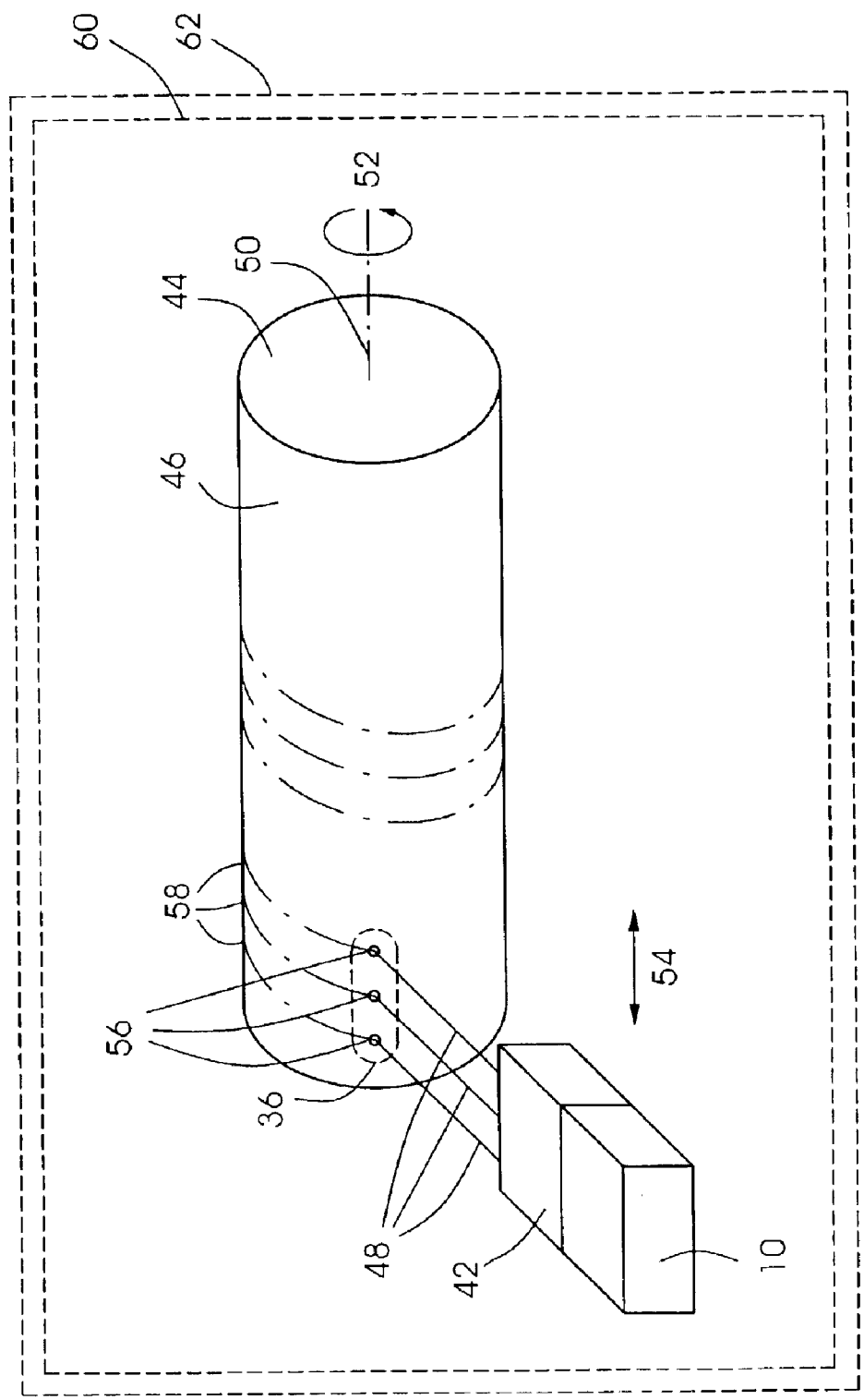
FIG. 3 shows a schematic representation of a specific embodiment of an imaging device according to the present invention in a print unit of a printing press, the printing form to be imaged being accommodated on a cylinder.

FIG. 3 schematically depicts a specific embodiment of an imaging device according to the present invention in a print unit of a printing press, the printing form to be recorded on being accommodated on a cylinder. The imaging device includes a laser diode bar 10, which has an imaging optics 42 configured downstream therefrom. The device is assigned to a rotatable cylinder 44. In this specific embodiment, a printing form 46 is accommodated on cylinder 44. Alternatively, the surface of cylinder 44 may constitute a printing form 46, i.e. be a printing surface. Cylinder 44 is rotatable about its axis 50 in rotational direction 52 indicated by the arrow and rotationally mounted in print unit 60. Print unit 60 constitutes a part of a printing press 62. Printing press 62 has a control system. The imaging device is movable in at least one direction, essentially in parallel to axis 50 of rotating cylinder 44. The preferably linear motion takes place in translational direction 54. Imaging light beams 48 produce image spots 56 in image field 36 on one part of the surface or printing form 46. In cooperation with the rotation of cylinder 44 and the translation of the imaging device, image spots 56 follow helical paths 58 about axis 50 of cylinder 44 along the surface of printing form 46. The control of printing press 62 coordinates the two movements. In the context of an advance feed corresponding to an interleave method, for example in accordance with German Patent Application No. 100 31 915 A1, helical paths 58 are entwined.

In one advantageous embodiment of print unit 60 schematically shown in FIG. 3, a number b of imaging devices according to the present invention is provided. Assigned to the b devices are b substantially same-sized sections of printing form 46 to be imaged (in other words having substantially the same number of printing dots to be set), so that, given a simultaneous imaging operation, a (1/b)-times imaging duration results.

In one special embodiment of the method for imaging a printing form, one laser diode from the groups of laser diodes of the laser diode bar is used for the imaging operation. When one imaging channel fails, the imaging operation is performed using another laser diode from the group to which the laser diode from the failed imaging channel belongs, as a replacement imaging channel. The imaging may then be carried out as a time-delayed, accelerated, or time-staggered operation.

Finally, a few quantitative remarks are made with regard to one specific embodiment of the imaging device according to the present invention. In selecting the distances among the laser diodes/imaging channels of a laser diode bar, one must, on the one hand, consider the crosstalk, above all the thermal crosstalk, and, on the other hand, the surface area required for the bonding pads. The width of a single-mode laser is typically about 3 to 5 micrometers. The minimal size of a bonding pad is typically 60 to 100 micrometers. At distances of less than 100 micrometers, it is necessary to compensate for thermal crosstalk.

As already mentioned, a configuration of laser diodes on a laser diode bar according to the present invention, in which two laser diodes are combined into a microarray or a group, is especially beneficial (see also FIG. 1). Thermal crosstalk may then be compensated relatively simply on the basis of a measurement of the radiant power of the laser diode in question. For example, the actual value may be measured on the rear reflector of the laser resonator; the actual value may be compared to a setpoint value in control unit 38. Since the actual value is influenced by the ambient environment of the laser diode in question, it is dependent on the operating state of the adjacent laser diode. An actuation is then carried out in a control function and, consequently, considers whether the adjacent laser diode is on or off. The distance between two laser diodes is within the range of between 8 and 22 micrometers, advantageously 10 or 20 micrometers, preferably symmetrically to the optical axis running through the downstream microlens, while the beam width ($1/e^2$ fall-off in illumination) in the laser diode is about 3 micrometers. Besides being determined by the thermal cross-talk, the distance among the groups of laser diodes is determined by the size of the microlenses for the slow axis and the bonding pads. A distance of about 170 micrometers between two adjacent groups of laser diodes is advantageous. Thermal crosstalk is unimportant for such distances. The design of the microlenses of the SALA is such that even beams offset by 10 micrometers from the optical axis may be imaged with adequate precision. The distance between laser diode bars and SALA (the optical path) is about 600 micrometers. Numerical apertures are about 0.5 for the fast-axis and 0.125 for the slow-axis direction upstream from the microoptics and about 0.09 downstream from the microoptics.

Reference Symbol List 10 laser diode bar
12 laser diode
14 emission region
16 array of microlenses
18 optical path
20 microlenses
22 first laser diode
24 second laser diode
26 first optical path
28 second optical path
30 first microlens
32 collimating optics
34 macrooptics
36 image field
38 control unit
40 imaging channel
42 imaging optics
44 cylinder
46 printing form
48 imaging light beam
50 axis
52 rotational direction
54 translational direction
56 image spot
58 path of an image spot
60 print unit
62 printing press

What is claimed is:

1. A device for imaging a printing form, the device comprising:

at least one laser diode bar having a plurality of laser diodes each with image spots not overlapping and lying disjunctly in an image field, the plurality of laser diodes including a first laser diode having a first optical path and a second laser diode having a second optical path; and an array of microlenses positioned in an emission region of light radiated by the laser diode bar, one of the microlenses being assigned to each optical path of the laser diodes, the array of microlenses including a first microlens, the first laser diode and the second laser diode being densely positioned on the laser diode bar in such a way that the first optical path of the first laser diode and the second optical path of the second laser diode run through the first microlens.

2. The device as recited in claim 1 wherein the laser diodes are independently addressable.

3. The device as recited in claim 1 further comprising a macro-optical system, the first and second optical paths, after passing through the first microlens, running through the macro-optical system to be focused in an image field.

4. The device as recited in claim 3 wherein the image field includes at least one section of a surface of a printing form.

5. The device as recited in claim 1 further comprising an optical system, the first and second optical paths, before passing through the first microlens, running through the optical system so as to collimate divergence of light emerging from the laser diode bar in at least one spatial direction normal to a propagation direction of the light.

6. The device as recited in claim 1 wherein the device is movable in at least one direction, a printing form to be imaged being accommodated on a rotatable cylinder or the printing form forming the surface of the rotatable cylinder, the at least one direction being parallel to an axis of the rotatable cylinder.

7. The device as recited in claim 1 wherein the laser diodes are surface-emitting laser diodes.

8. A print unit comprising a device for imaging a printing form, the device including:

at least one laser diode bar having a plurality of laser diodes each with image spots not overlapping and lying disjunctly in an image field, the plurality of laser diodes including a first laser diode having a first optical path and a second laser diode having a second optical path; and an array of microlenses positioned in an emission region of light radiated by the laser diode bar, one of the microlenses being assigned to each optical path of the laser diodes, the array of microlenses including a first microlens, the first laser diode and the second laser diode being densely positioned on the laser diode bar in such a way that the first optical path of the first laser diode and the second optical path of the second laser diode run through the first microlens.

9. A printing press comprising at least one print unit, the at least one print unit including:

at least one laser diode bar having a plurality of laser diodes each with image spots not overlapping and lying disjunctly in an image field, the plurality of laser diodes including a first laser diode having a first optical path and a second laser diode having a second optical path; and an array of microlenses positioned in an emission region of light radiated by the laser diode bar, one of the microlenses being assigned to each optical path of the laser diodes, the array of microlenses including a first microlens, the first laser diode and the second laser diode being densely positioned on the laser diode bar in such a way that the first optical path of the first laser diode and the second optical path of the second laser diode run through the first microlens.

10. A method for imaging a printing form comprising the steps of:

using at least one laser diode bar having a plurality of independently addressable laser diodes each with image spots not overlapping and lying disjunctly in an image field, with an array of microlenses positioned in an emission region of radiated light from the laser diodes, one microlens being assigned to each optical path of the laser diodes, said laser diode bar having a first laser diode with a first optical path passing through a first microlens of the array and a second laser diode having a second optical path passing through the first microlens of the array, the first and second laser diodes being disposed densely on the laser diode bar.

11. The method as recited in claim 10 further comprising operating either the first laser diode or the second laser diode.

12. The method as recited in claim 10 further comprising operating the first laser diode and the second laser diode when another laser diode with another optical path running through another microlens of the array has failed.

* * * * *